(12) United States Patent
Tsirkin

(10) Patent No.: US 9,411,624 B2
(45) Date of Patent: Aug. 9, 2016

(54) VIRTUAL DEVICE INTERRUPT HINTING IN A VIRTUALIZATION SYSTEM

(75) Inventor: Michael S. Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 727 days.

(21) Appl. No.: 13/302,591

(22) Filed: Nov. 22, 2011

(65) Prior Publication Data

US 2013/0132949 A1 May 23, 2013

(51) Int. Cl.
*G06F 9/46* (2006.01)
*G06F 9/455* (2006.01)

(52) U.S. Cl.
CPC .. *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 4,959,781 A * | 9/1990 | Rubinstein et al. | ........... 710/262 |
| 6,397,242 B1 | 5/2002 | Devine et al. | |
| 6,496,847 B1 | 12/2002 | Bugnion et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,735,601 B1 | 5/2004 | Subrahmanyam | |
| 6,785,886 B1 | 8/2004 | Lim et al. | |
| 6,789,156 B1 | 9/2004 | Waldspurger | |
| 6,795,966 B1 | 9/2004 | Lim et al. | |
| 7,665,088 B1 * | 2/2010 | Bugnion et al. | ................. 718/1 |
| 8,312,456 B2 * | 11/2012 | Hepkin et al. | ................ 718/100 |
| 8,381,213 B1 * | 2/2013 | Naamad | ............. G06F 12/0862 718/100 |
| 8,527,988 B1 * | 9/2013 | Rhine | ............................... 718/1 |
| 2005/0125582 A1 * | 6/2005 | Tu et al. | ........................ 710/260 |
| 2009/0228625 A1 * | 9/2009 | Kulkarni | ....................... 710/263 |
| 2011/0145829 A1 * | 6/2011 | Molnar et al. | ................ 718/104 |
| 2011/0161541 A1 * | 6/2011 | Madukkarumukumana et al. | ............................ 710/260 |
| 2012/0272241 A1 * | 10/2012 | Nonaka et al. | .................... 718/1 |

OTHER PUBLICATIONS

VMware ESX Server 2, "Best Practices Using VMware Virtual SMP", pp. 1-8, WMware, Inc. 1998-2005, vmware.com/pdf/vsmp_best_practices.pdf, Jul. 12, 2005.

* cited by examiner

*Primary Examiner* — Meng An
*Assistant Examiner* — Bradley Teets
(74) *Attorney, Agent, or Firm* — Lowenstein Sandler LLP

(57) ABSTRACT

A mechanism for virtual device interrupt hinting in virtualization systems is disclosed. A method of the invention includes receiving a virtual device event from a host central processing unit (CPU) of a multi-CPU host machine, the virtual device event directed to a virtual machine (VM) managed by the hypervisor on the host machine, identifying one or more virtual CPUs (VCPUs) of the VM that are running on the host CPU, and providing the identified one or more VCPUs of the VM as a hint to the VM, the hint sent to the VM with the virtual device event, wherein the VM programs a virtual device associated with the event to deliver interrupts to a VCPU of the VM identified in the hint.

17 Claims, 5 Drawing Sheets

300

Receive virtual device event from a host CPU of a multi-processor host machine, the virtual device event directed to a VM running on the host machine
310

↓

Reference VCPU-to-host CPU mappings in hypervisor memory to identify one or more VCPU(s) (of VM that event is directed to) that are running on the host CPU that originated the virtual device event
320

↓

Provide one or more of the identified VCPU(s) to VM as a hint that is sent along with the event to the VM
330

↓

Intercept programming instruction from the VM, the programming instruction directing interrupts associated with a type of the event to a VCPU that was identified in the provided hint
340

↓

Interpret the programming instruction so that any interrupts associated with the type of event are sent to the indicated VCPU
350

*Fig. 3*

VIRTUAL DEVICE INTERRUPT HINTING IN A VIRTUALIZATION SYSTEM

TECHNICAL FIELD

The embodiments of the invention relate generally to virtualization systems and, more specifically, relate to virtual device interrupt hinting in virtualization systems.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the VM operating system or the remote client that uses the VM.

A VM may be allocated more than one CPU (called a virtual CPU or VCPU). Virtual symmetric multiprocessing (SMP) allows VMs to be deployed with multiple VCPUs to execute applications on the VM that spawn multiple processes and to execute multi-threaded applications on the VM that can take advantage of additional VCPUs.

In many cases, VMs with multiple VCPUs may be running on a host machine having multiple physical CPUs as well. Such a scenario can result in inefficiencies when a virtual device of a VM tries to communicate with the VM. A virtual device (sometimes referred to as an emulated device) of a VM exists entirely in software. A virtual device has an emulated device driver which acts as a translation layer between the OS running on the host machine (which manages the source device of the virtual device) and the guest OS running on the VM. The device level instructions directed to and from the virtual device are intercepted and translated by the hypervisor. Any device of the same type as that being emulated and recognized by the kernel of the host machine OS is able to be used as the backing source for the emulated drivers.

Currently, virtual devices exposed by the hypervisor to the VM can be programmed by the VM to trigger interrupts on any one of a VM's VCPUs. In the host machine multi-processor case, inefficiencies result when an interrupt is sent from a first host machine CPU to a VCPU of the VM that is running on a second (different) host machine CPU. This is because the first host machine CPU sending the interrupt must communicate with the second host machine CPU when the VCPU running on the second host machine CPU receives and processes the interrupt. This inter-host machine CPU communication requires notifications, which result in unnecessary resource consumption and time delays.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3 is a flow diagram illustrating a method for virtual device interrupt hinting in virtualization systems according to an embodiment of the invention;

DETAILED DESCRIPTION

Figure 1:
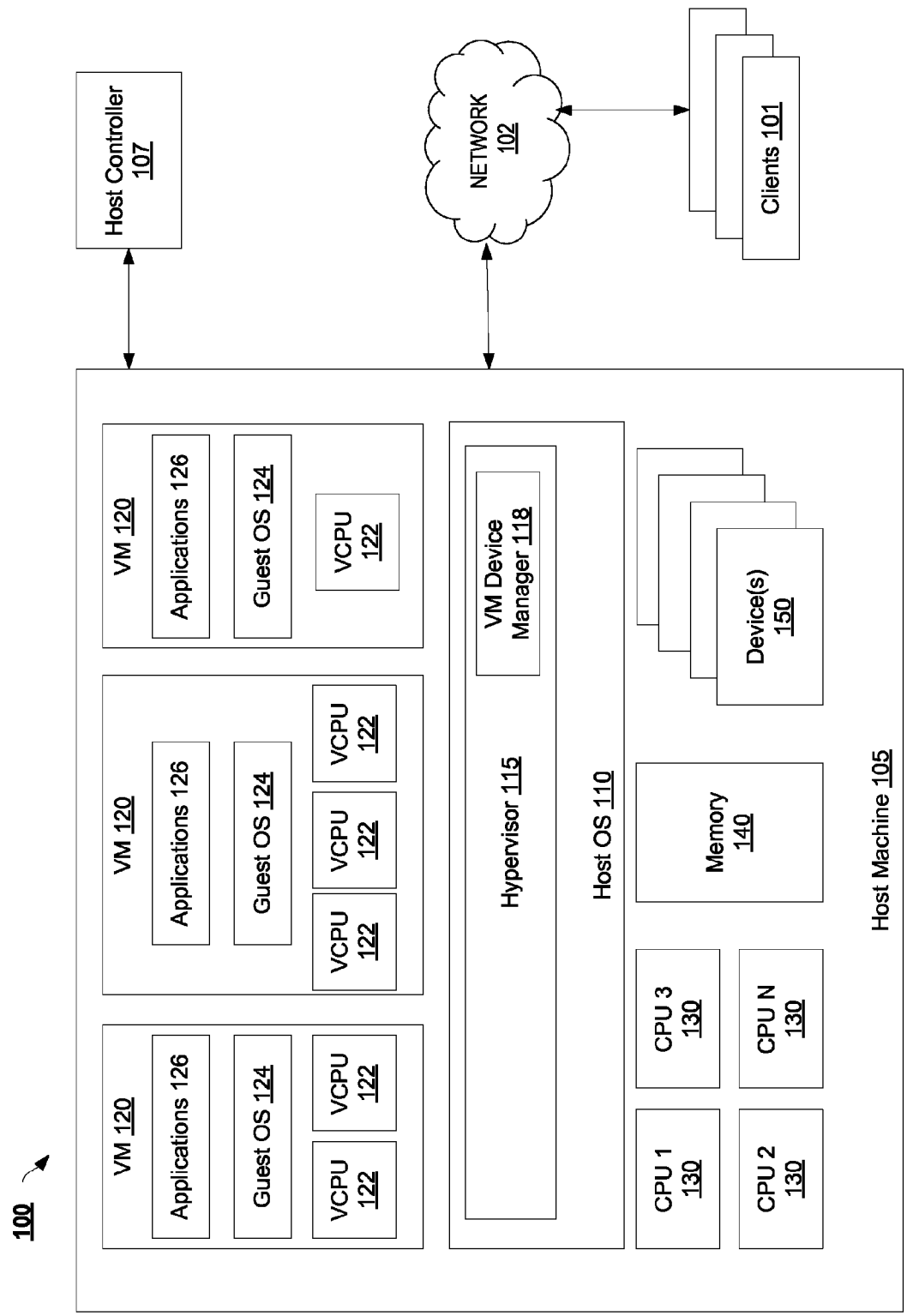
FIG. 1 is a block diagram of an exemplary virtualization network architecture in which embodiments of the present invention may operate.

Embodiments of the invention provide a mechanism for virtual device interrupt hinting in virtualization systems. A method of embodiments of the invention includes receiving a virtual device event from a host central processing unit (CPU) of a multi-CPU host machine, the virtual device event directed to a virtual machine (VM) managed by the hypervisor on the host machine, identifying one or more virtual CPUs (VCPUs) of the VM that are running on the host CPU, and providing the identified one or more VCPUs of the VM as a hint to the VM, the hint sent to the VM with the virtual device event, wherein the VM programs a virtual device associated with the event to deliver interrupts to a VCPU of the VM identified in the hint.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "identifying", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for virtual device interrupt hinting in virtualization systems. Embodiments of the invention utilize a virtual device interrupt optimization applicable to situations where a host machine is running multiple host central processing units (CPUs) and a hypervisor is managing one or more virtual machines (VMs) on the host machine that utilize multiple virtual CPUs (VCPUs). When a virtual device event on one of the host CPUs is received at the hypervisor from the host CPU, the hypervisor determines which one or more VCPUs (of the VM that the virtual device event is directed to) runs on the host CPU. Then, the hypervisor provides these one or more identified VCPUs as a hint (sent along with the event) to the VM. When the VM receives the hint, it may take the identified one or more VCPUs into account when programming the virtual device to deliver interrupts to appropriate VCPUs.

FIG. 1 illustrates an exemplary virtualization network architecture 100 in which embodiments of the present invention may operate. The virtualization network architecture 100 may include a host machine 105 coupled to one or more clients 101 over a network 102. The network 102 may be a private network (e.g., a local area network (LAN), wide area network (WAN), intranet, etc.) or a public network (e.g., the Internet). In other embodiments, the host machine 105 and clients 101 may be part of the same machine. The host machine 105 may be coupled to a host controller 107 (via a network or directly). Alternatively, the host controller 107 may be part of the host machine 105.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 105 and re-direct the received data to a display or other user interface.

In one embodiment, host machine 105 includes a server or a cluster of servers to run a plurality of VMs 120. Each VM 120 may include one or more virtual CPUs (VCPUs) 122. The VCPUs 122 of a VM 120 may in turn, run a guest operating system (OS) 124 to manage its resources and run one or more applications 126 on the VM 122. The VMs 120 may run the same or different guest operating systems, such as Microsoft Windows®, Linux®, Solaris®, Mac® OS, etc.

The host machine 105 also runs a host OS 110 to manage system resources of the host machine 105. Such system resources may include, but are not limited to, multiple CPUs 130, a memory 140, devices 150, and other hardware components. In one embodiment, the host machine 105 includes a hypervisor 115 configured to virtualize access to the underlying host machine hardware, making the use of VMs 120 transparent to the clients 101. The hypervisor 115 may also be known as a virtual machine monitor (VMM) or a kernel-based hypervisor. In some embodiments, the hypervisor 115 may be part of the host OS 110 (as illustrated in FIG. 1).

Each VM 120 can be accessed by one or more of the clients 101 over the network 102. In one scenario, the VM 120 can provide a virtual desktop for the client 101. The host machine 105 and VMs 120 can be managed by the host controller 107. The host controller 107 may also add a VM 120, delete a VM 120, balance the load on the server cluster, provide directory service to the VMs 120, and perform other management functions.

In one embodiment, the devices 150 of host machine 105 may include physical hardware devices and emulated devices that are emulated by the hypervisor 115 to the VMs 120. Although not shown in the embodiment of FIG. 1, some of the devices 150 may be internal to host machine 105 and some of the devices 150 may be external and communicably coupled to host machine 105. Examples of devices 150 include, but are not limited to, network interface cards (NICs), storage devices, sound or video adapters, photo/video cameras, printer devices, and any devices that can be emulated or assigned to and used by the VM 120. In some embodiments, devices 150 are emulated in VMs 120 as virtual devices.

In many cases, such as that depicted in FIG. 1, VMs 120 with multiple VCPUs 122 may be running on a host machine 105 having multiple physical CPUs 130. Such a scenario can result in inefficiencies when a virtual device of a VM 120 tries to communicate with the VM 120. In one embodiment, hypervisor 115 includes a VM device manager 118 to implement an optimized device interrupt mechanism to avoid such inefficiencies. The optimized device interrupt mechanism is described further with respect to FIG. 2.

Figure 2:
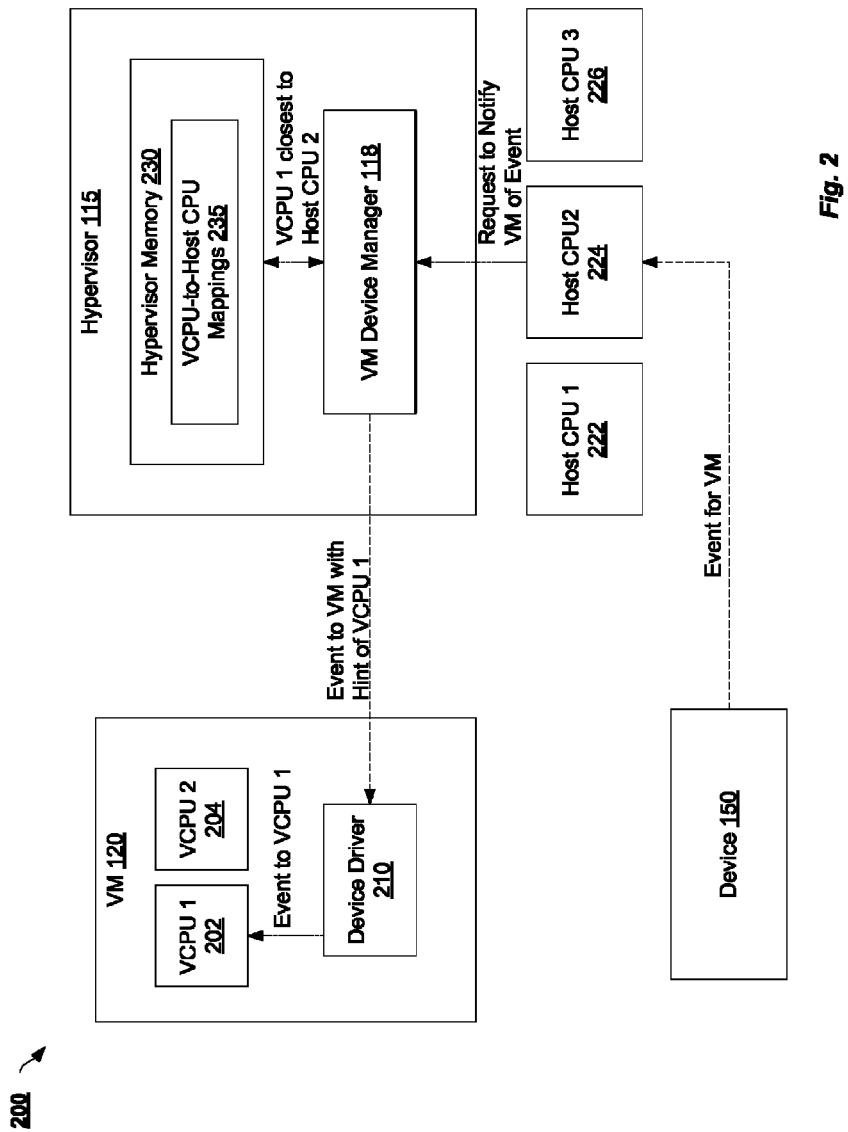
FIG. 2 is a block diagram of a host machine configured to perform optimized virtual device interrupts according to embodiments of the invention.

FIG. 2 is a block diagram of a host machine 200 configured to perform optimized virtual device interrupts according to embodiments of the invention. Host machine 200 includes hypervisor 115, VM 120, and device 150, all described with respect to FIG. 1. In addition, host machine 200 is depicted as including multiple processors: host CPU 1 222, host CPU 2 224, and host CPU 3 226. In one embodiment, host CPUs 1 222, 2 224, and 3 226 are the same as CPUs 130 described with respect to FIG. 1. In addition, VM 120 is depicted as including multiple VCPUs: VCPU 1 202 and VCPU 2 204. In one embodiment, multiple VCPUs 1 202 and 2 204 are the same as VCPUs 122 described with respect to FIG. 1.

In one embodiment, device 150 is emulated by hypervisor 115 as a virtual device for VM 120. In some embodiments, VM device manager 118 of hypervisor 115 is responsible for emulating device 150 to VM 120 as a virtual device. A virtual device (sometimes referred to as an emulated device) for a VM 120 exists entirely in software. A virtual device has an emulated device driver 210 on VM 120 which acts as a translation layer between the OS running on the host machine 200 (which manages the source device 150 of the virtual device) and the guest OS running on the VM 120. The device level instructions directed to and from the virtual device are intercepted and translated by the hypervisor 115.

In embodiments of the invention, hypervisor 115 implements optimized virtual device interrupts for VM 120. When device 150 has a virtual device event it needs to send to VM 120, it is programmed (i.e., by the host machine 200 OS) to send this event to a particular host CPU 222, 224, 226. For purposes of illustration, device 150 is shown as being programmed to send its event to host CPU 2 224 of host machine 200. Hypervisor 115 is then responsible for providing the event to VM 120 via an interrupt. Embodiments of the invention utilize a hint, sent along with the virtual device event, to notify the VM 120 of which of its VCPUs 202, 204 are topologically closest to host CPU 2 224 (the host CPU that originated the virtual device event).

In embodiments of the invention, the word "topology" may refer to the shape of a local-area network (LAN) or other communications system. Topological closeness in embodiments of the invention refers to the speed of signaling and memory sharing between two nodes. Examples of topologically close CPUs may include two or more CPUs that use the same Non-Uniform Memory Access (NUMA) node in a NUMA setup, or two or more CPUs that use the same processor core in a hyperthreaded setup.

For instance, in embodiments of the invention, when hypervisor 115 receives a request to notify VM 120 of a device 150 event, then VM device manager 118 may first access VCPU-to-host CPU mappings 235 stored in hypervisor memory 230 to determine if there are any VCPUs 202, 204 running on VM 120 that are associated with host CPU 2 224 (i.e., topological proximity). If the mapping 235 show that host CPU 2 224 emulates VCPU 1 202 on VM 120, then VM device manager 118 may send this information as a hint along with the virtual device event to VM 120. In one embodiment, the hint is an ID of the identified VCPU 1 202.

In one embodiment, when VM 120 receives the event, it retrieves the hint and implements it in such a way that the event will be delivered to VCPU 1 202. In some embodiments, the VM 120 may program the emulated device driver 210 to deliver message signaling interrupts associated with a type of the virtual device to VCPU 1 202. In other embodiments, the VM 120 may program a virtual Advanced Programmable Interrupt Controller (APIC) of the VM 120 to deliver message signaling interrupts associated with a type of the virtual device to VCPU 1 202. In both cases, the hypervisor 115 captures and interprets these programming instructions so that any interrupts associated with the programming instructions are sent to the correct VCPU 1 202 and/or 2 204 for the virtual device event.

In some embodiments, hint delivery happens once for a type of event to the VM, and then the VM programs for all future received events of that type. The hinting will then repeats when the underlying information changes. For example, the hinting may repeat when a VCPU 202 moves to another host CPU 222, 226, or if the event is generated on another host CPU 222, 226.

In other embodiments, instead of the VM 120 explicitly obeying the provided hint, the VM 120 may utilize the hint as an optional suggestion. For instance, the VM 120 may have a load balancing policy and may utilize the hint as a factor to weigh in favor of the identified VCPU in the load balancing policy.

In some embodiment, the hint may encompass more than one VCPU on the VM 120. For instance, the hypervisor 115 may identify all of, or a subset of, the VCPUs 202, 204 on the VM 120 and rank them according to topological proximity to the event-delivering host CPU 224. The VM device manager 118 may then send this list of VCPUs to the VM 120 as the hint, and the VM 120 processes this list accordingly.

In some embodiments of the invention, the hypervisor 115 may actively notify the VM 120 whenever a mapping between VCPU-to-host CPU changes. When the VM 120 receives such an update, it may then respond by re-programming the new VCPU for the interrupts for those particular events.

In some embodiments, the VM 120 may query the hypervisor 115 for interrupt hints. The VM 120 may send this query when it receives every virtual device event, at pre-determined intervals, or once every X events. In other embodiments, a combination of the above options may be utilized. For instance, periodically the VM 120 may check whether any events have fired more than Y number of times, and only for those event request a hint from the hypervisor 115. As a result, events that fire rarely are not programmed for interrupts to a particular VCPU 202, 204 by the VM 120. One skilled in the art will appreciate that other options than those listed above for when to query are also possible.

FIG. 3 is a flow diagram illustrating a method 300 for virtual device interrupt hinting in virtualization systems according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by hypervisor 115 and/or VM device manager 118 of FIGS. 1 and 2.

Method 300 begins at block 310 where a virtual device event is received by a hypervisor from a host CPU of a multi-processor host machine. The virtual device event is directed to a VM running on the host machine that is managed by the hypervisor. The VM includes a plurality of VCPUs. In one embodiment, the device associated with the virtual device event is programmed by the host OS to send virtual device events to a particular host CPU, which then provides the events to the hypervisor.

Then, at block 320, a VCPU-to-host CPU mapping in the hypervisor's memory is referenced in order to identify one or more VCPU(s) that are running on the host CPU that sent the virtual device event. The one or more VCPU(s) are running on the VM to which the event is directed. Subsequently, at block 330, the identified one or more VCPU(s) are provided to the VM as a hint. In one embodiment, the VCPU hint is provided along with the event to the VM. In some embodiments, the hint is a list of all, or a subset of, the VCPUs running on the VM ranked in order of topological closeness to the host CPU originating the event.

At block 340, a programming instruction is intercepted from the VM by the hypervisor. In one embodiment, the programming instruction directs interrupts associated with the virtual device event to a VCPU that was identified in the provided hint. For example, the programming instruction from the VM may request to program an emulated device driver for the virtual device to send interrupts for an event type to a particular VCPU of the VM that is in the provided hint. In another embodiment, the programming instruction from the VM may a request to program a virtual APIC device of the VM to send interrupts for an event type to a particular VCPU of the VM that is in the provided hint. At block 350, the programming instruction is interpreted by the hypervisor so that any interrupts associated with the type of the event are sent to the indicated VCPU.

Figure 4:
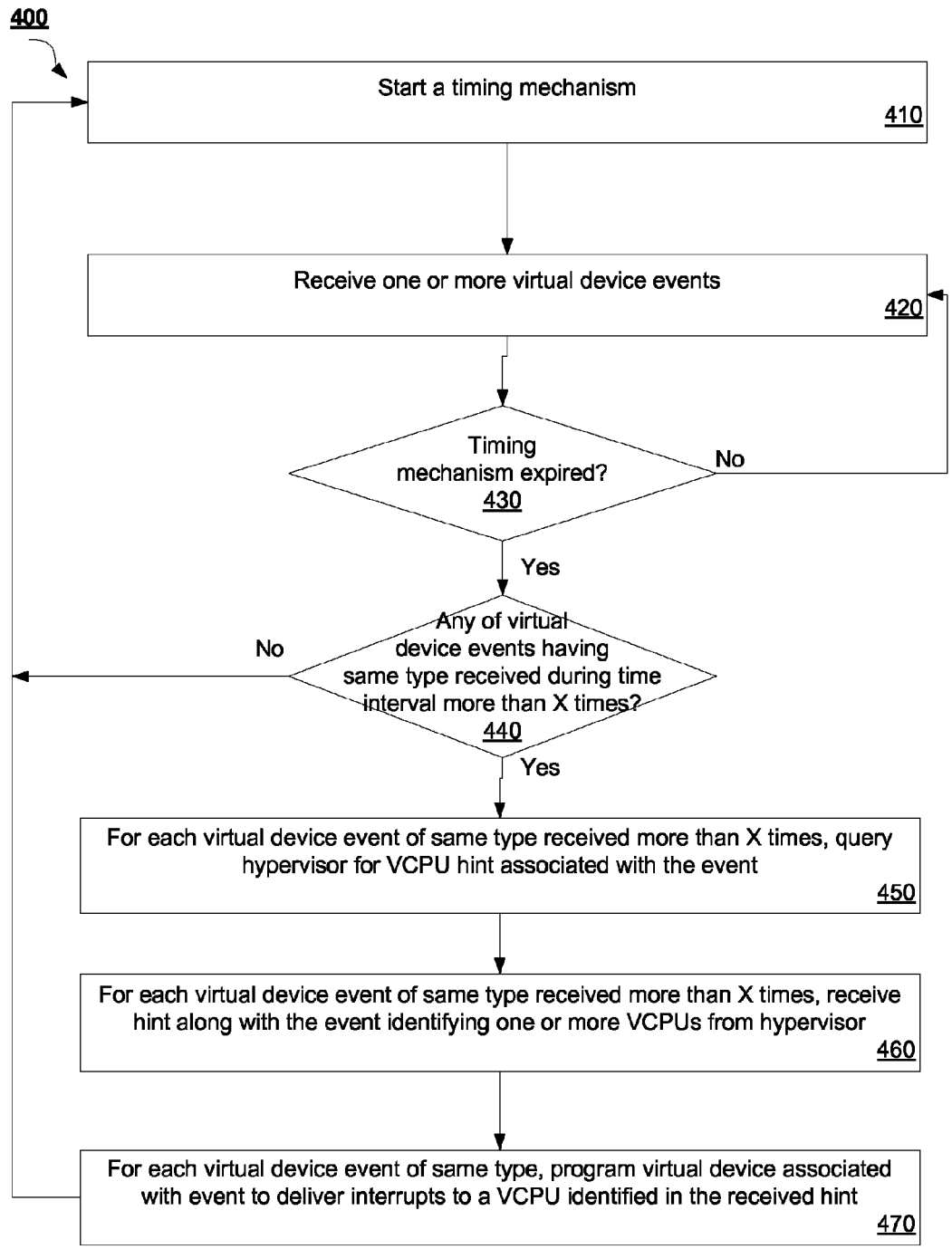
FIG. 4 is a flow diagram illustrating another method for virtual device interrupt hinting in virtualization systems according to an embodiment of the invention.

FIG. 4 is a flow diagram illustrating another method 400 for virtual device interrupt hinting in virtualization systems according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by VM 120 of FIGS. 1 and 2.

Method 400 begins at block 410 where a timing mechanism at a VM is started. In one embodiment, the timing mechanism is initialized with a pre-configured time interval. In some embodiments, an administrator of the virtualization system or an end user of the VM may configure the timing mechanism with an adjustable value. Then, at block 420, one or more virtual device events are received at the VM from one or more virtual devices. A virtual device of the VM exists entirely in software and has an emulated device driver on the VM that acts as a translation layer between the host machine OS and the VM guest OS. The device level instructions directed to and from the virtual device are intercepted and translated by the hypervisor.

At decision block 430, it is determined whether the timing mechanism has expired. If not, method 400 returns to block 420 to continue receiving virtual device events. On the other hand, if the timing mechanism has expired, then method 400 proceeds to decision block 440, where it is determined whether any of the virtual device events received during the time interval were received more than X times, where X is a preconfigured threshold amount. In some embodiments, an administrator of the virtualization system or a user of the VM may configure the amount X. If no virtual device events were received more than X times at decision block 440, the method 400 returns to block 410 to start the timing mechanism again.

However, if one or more virtual device events were received more than X times, then method 400 proceeds to block 450 where for each virtual device event received more than X times, the hypervisor is queried for a VCPU hint associated with the event. In one embodiment, in response to the query, the hypervisor determines one or more VCPU(s) associated with a host CPU the originated the virtual device event. Then, at block 460, for each event received more than X times, a hint is received from the hypervisor. In one embodiment, the hint lists one or more VCPU(s) of the VM that are associated with the event. In one embodiment, the one or more VCPU(s) identified are those that are topologically closest to the host CPU originating the virtual device event on the host machine.

Lastly, at block 470, for each event received more than X times, a virtual device of the VM associated with the event is programmed by the VM. In one embodiment, the virtual device is programmed to deliver interrupts associated with a type of event to a VCPU identified in the received hint. In some embodiments, the VM may use the VCPU identified in the hint as a consideration in a load balancing algorithm implemented by the VM. For instance, a VCPU identified in a hint may be given higher weighting in load balancing considerations for handling incoming interrupts associated with the type of the event. Method 400 may then return to block 410 to start over again in an iterative fashion.

Figure 5:
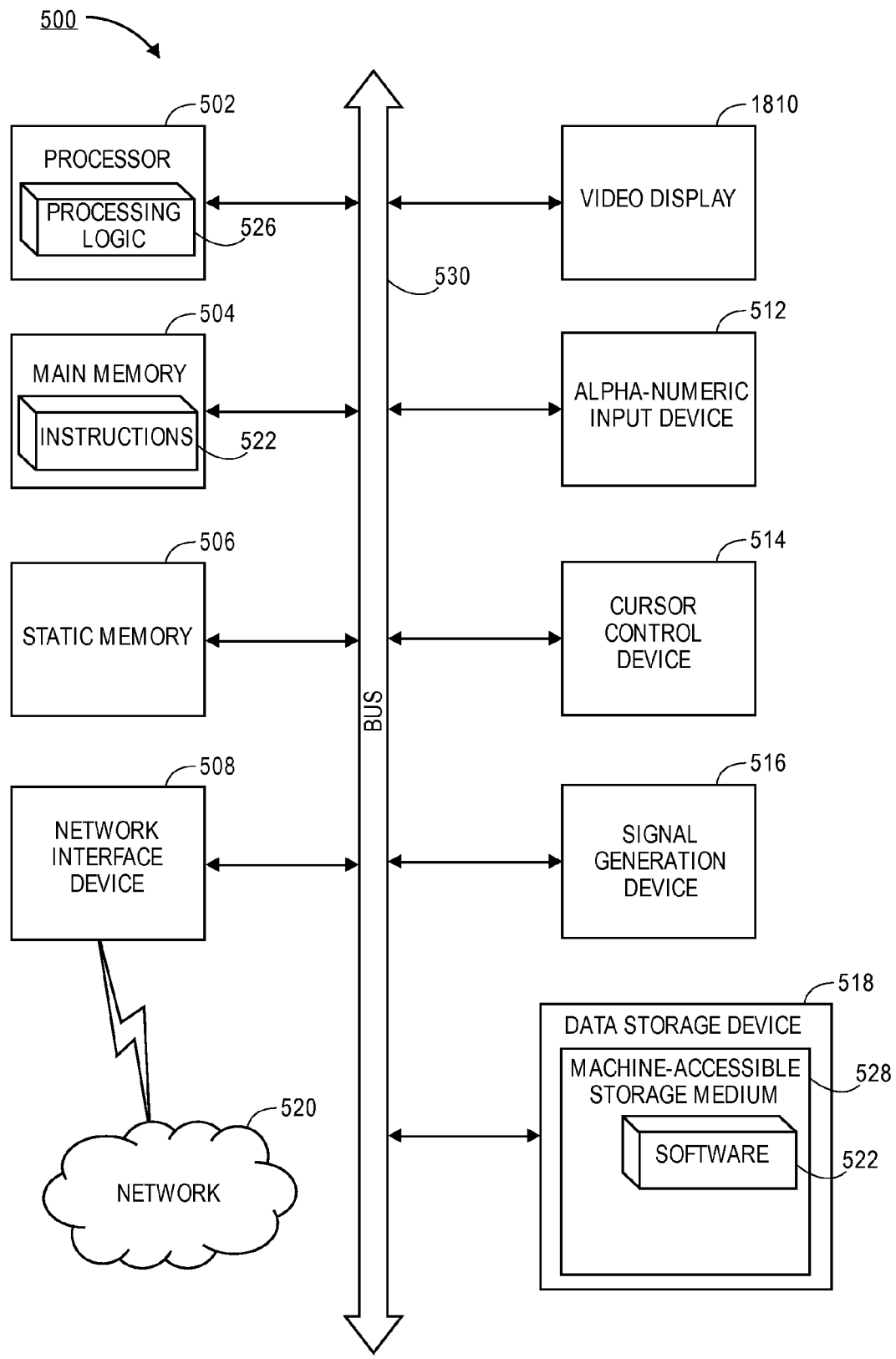
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored software 524 embodying any one or more of the methodologies of functions described herein. For example, software 524 may store instructions to perform virtual device interrupt hinting in virtualization systems by host machine 105 described with respect to FIG. 1. The software 524 may also reside, completely or at least partially, within the main memory 504 and/or within the processing device 502 during execution thereof by the computer system 500; the main memory 504 and the processing device 502 also constituting machine-accessible storage media.

The machine-readable storage medium 528 may also be used to store instructions to perform methods 300 and 400 for virtual device interrupt hinting in virtualization systems described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by at least one processing device of a multi-central processing unit (CPU) host machine, a virtual device event received at a hypervisor executed by the at least one processing device, the virtual device event sent from a host CPU of the multi-CPU host machine, wherein the virtual device event comprises device level instructions of a device of the host machine directed to a virtual machine (VM) managed by the hypervisor on the host machine, wherein the device is emulated by the hypervisor as a virtual device for the VM;
   maintaining, by the processing device, a data structure for virtual CPU (VCPU)-to-host CPU mappings;
   responsive to receiving a type of the virtual device event for a first time at the VM, identifying, by the processing device from the VCPU-to-host CPU mapping of the data structure in a memory of the hypervisor, VCPUs corresponding to the VM that are running on the host CPU;
   generating, by the processing device via the hypervisor, a hint comprising the identified VCPUs of the VM; and
   providing, by the processing device via the hypervisor, the hint with the virtual device event to the VM, wherein the hint to cause the VM to program the virtual device to deliver interrupts to at least one of the identified VCPUs indicated in the hint.

2. The method of claim 1, further comprising, subsequent to the providing, receiving a programming instruction from the VM that directs interrupts corresponding to the virtual device event to the at least one of the identified VCPUs of the VM.

3. The method of claim 2, wherein the programming instruction comprises the VM programming a virtual device driver for the virtual device to deliver the interrupts corresponding to the virtual device event to the at least one of the identified VCPUs of the VM.

4. The method of claim 2, wherein the programming instruction comprises the VM programming a virtual Advanced Programmable Interrupt Controller (APIC) of the VM to deliver the interrupts corresponding to the virtual device event to the at least one of the identified VCPUs of the VM.

5. The method of claim 1, wherein the providing the identified VCPUs as a hint further comprises sequentially ordering the identified VCPUs according to topological proximity to the host CPU and providing the sequential ordering of the identified VCPUs.

6. The method of claim 1, wherein the VM increases a weighting value corresponding to the identified VCPUs in a load balancing algorithm implemented by the VM.

7. The method of claim 1, wherein the VM queries the hypervisor for the hint.

8. A system, comprising:
   a memory; and
   a plurality of central processing units (CPUs) communicably coupled to the memory, the plurality of CPUS to execute a virtual machine (VM) from the memory and to:
   receive virtual device events for a virtual device of the VM, the virtual device events comprising device level instructions of a device of the system and directed to the VM, wherein the device is emulated by a hypervisor as a virtual device for the VM;
   query the hypervisor managing the VM for a virtual central processing unit (VCPU) hint associated with the virtual device events, wherein the VCPU hint is generated by the hypervisor when the hypervisor references a VCPU-to-host CPU mapping in a memory of the hypervisor in order to identify the VCPUs of the VM to include in the VCPU hint, responsive to the VM receiving a type of the virtual device events for a first time, to identify VCPUs of the VM running on a CPU of the plurality of CPUs that originated the virtual device events, wherein the hypervisor maintains a data structure for VCPU-to-host CPU mappings;
   receive the VCPU hint from the hypervisor as part of the virtual device events, the VCPU hint comprising identification of the identified VCPUs of the VM; and
   program the virtual device to deliver interrupts to at least one of the identified VCPUs of the VM identified in the VCPU hint.

9. The system of claim 8, wherein the plurality of CPUs are further to cause the VM to initialize a timing mechanism of the VM with a time interval, start the timing mechanism, and receive the virtual device events during the time interval of the timing mechanism.

10. The system of claim 9, wherein the plurality of CPUs are further to cause the VM to determine that a number of times that the virtual device events were received at the VM during the time interval exceeds a threshold amount.

11. The system of claim 8, wherein the plurality of CPUs to program the virtual device to deliver the interrupts to the least one of the identified VCPUs of the VM further comprises the plurality of CPUs to cause the VM to program a virtual device driver of the virtual device to deliver the interrupts corresponding to the virtual device events to the at least one of the identified VCPUs of the VM.

12. The system of claim 8, wherein the plurality of CPUs to program the virtual device to deliver the interrupts to the at least one of the identified VCPUs of the VM further comprises the plurality of CPUs to cause the VM to program a virtual Advanced Programmable Interrupt Controller (APIC) of the VM to deliver the interrupts corresponding to the virtual device event to the at least one of the identified VCPUs of the VM.

13. The system of claim 8, wherein the plurality of CPUS are further to cause the VM to increase a weighting value corresponding to the identified VCPUs in a load balancing algorithm implemented by the VM.

14. A non-transitory machine-readable storage medium including instructions that, when accessed by a processing device, cause the processing device:

receive, by the processing device of a multi-central processing unit (CPU) host machine, a virtual device event received at a hypervisor executed by the at least one processing device, the virtual device event sent from a host CPU of the multi-CPU host machine, wherein the virtual device event comprises device level instructions of a device of the host machine directed to a virtual machine (VM) managed by the hypervisor on the host machine, wherein the device is emulated by the hypervisor as a virtual device for the VM;

maintain, by the processing device, a data structure for virtual CPU (VCPU)-to-host CPU mappings;

responsive to receiving a type of the virtual device event for a first time at the VM, identify, by the processing device from the VCPU-to-host CPU mapping of the data structure in a memory of the hypervisor, VCPUs corresponding to the VM that are running on the host CPU;

generate, by the processing device via the hypervisor, a hint comprising the identified VCPUs of the VM; and provide, by the processing device via the hypervisor, the hint with the virtual device event to the VM, wherein the hint to cause the VM to program the virtual device to deliver interrupts to at least one of the identified VCPUs indicated in the hint.

15. The non-transitory machine-readable storage medium of claim 14, wherein the processing device further to, subsequent to the providing, receive a programming instruction from the VM that directs interrupts corresponding to the virtual device event to the at least one of the identified VCPUs of the VM.

16. The non-transitory machine-readable storage medium of claim 14, wherein the processing device to provide the identified VCPUs as a hint further comprises the processing device to sequentially order the identified VCPUs according to topological proximity to the host CPU and providing the sequential ordering of the identified VCPUs.

17. The non-transitory machine-readable storage medium of claim 14, wherein the processing device is further to cause the VM to increase a weighting value corresponding to the identified VCPUs in a load balancing algorithm implemented by the VM.

* * * * *